(12) United States Patent
Daamen et al.

(10) Patent No.: US 12,529,406 B2
(45) Date of Patent: Jan. 20, 2026

(54) TEMPORARY DAMPER ASSEMBLY

(71) Applicant: Siemens Gamesa Renewable Energy A/S, Brande (DK)

(72) Inventors: Joris Daamen, Rotterdam (NL); Kristian Fjordgaard, Vejle (DK); Morten Fogh Jacobsen, Hjørring (DK); Asger Holck Nielsen, Århus C (DK); Soeren Markkilde Pedersen, Stenløse (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 544 days.

(21) Appl. No.: 17/915,049

(22) PCT Filed: Mar. 26, 2021

(86) PCT No.: PCT/EP2021/057947
§ 371 (c)(1),
(2) Date: Sep. 27, 2022

(87) PCT Pub. No.: WO2021/198074
PCT Pub. Date: Oct. 7, 2021

(65) Prior Publication Data
US 2023/0105755 A1  Apr. 6, 2023

(30) Foreign Application Priority Data
Apr. 3, 2020 (EP) .................... 20167989

(51) Int. Cl.
*F16F 7/10* (2006.01)
*F03D 13/40* (2016.01)

(52) U.S. Cl.
CPC ............ *F16F 7/1034* (2013.01); *F03D 13/40* (2016.05); *F05B 2260/02* (2013.01);
(Continued)

(58) Field of Classification Search
CPC ................ F16F 7/1034; F16F 2222/08; F16F 2230/0005; F03D 13/40; F03D 13/20;
(Continued)

(56) References Cited

U.S. PATENT DOCUMENTS 8,878,377 B2   11/2014  Ollgaard et al.
2011/0198174 A1   8/2011  Ollgaard
(Continued)

FOREIGN PATENT DOCUMENTS

CN   101852188 A   10/2010
CN   105822509 A    8/2016
(Continued)

OTHER PUBLICATIONS

WO document No. 2020/002393 to Mortensen published on Jan. 2, 2020.*
(Continued)

*Primary Examiner* — Pamela Rodriguez
(74) *Attorney, Agent, or Firm* — Schmeiser, Olsen & Watts LLP

(57) ABSTRACT

A temporary damper assembly for use during vertical storage and/or vertical transport of a tower includes a liquid damper tuned to the natural frequency of vibration of the tower; a tower cover realized to cover an annular upper opening of the tower during storage and/or transport; a mounting interface configured to suspend the liquid damper from the annular upper opening of the tower; and a load transfer interface for the transfer of loads between the liquid damper and the tower. A method of suppressing vortex-induced vibration in a tower during vertical storage and/or vertical transport of the tower is also provided.

16 Claims, 3 Drawing Sheets

(52) U.S. Cl.
CPC ..... *F05B 2260/964* (2013.01); *F16F 2222/08* (2013.01); *F16F 2230/0005* (2013.01)

(58) Field of Classification Search
CPC ........... F05B 2260/02; F05B 2260/964; Y02E 10/72; Y02E 10/727; Y02E 10/728
See application file for complete search history.

(56) References Cited

U.S. PATENT DOCUMENTS

| | | | |
|---|---|---|---|
| 2013/0195653 A1* | 8/2013 | Hayashi | F03D 7/0296 |
| | | | 416/1 |
| 2016/0215754 A1 | 7/2016 | Seidel | |
| 2018/0017043 A1 | 1/2018 | Nielsen et al. | |
| 2020/0284315 A1* | 9/2020 | Rumler | B61B 3/00 |
| 2020/0332548 A1 | 10/2020 | Mortensen et al. | |
| 2020/0355166 A1* | 11/2020 | Mortensen | F03D 80/00 |
| 2022/0307479 A1* | 9/2022 | Antonsen | B63B 25/002 |

FOREIGN PATENT DOCUMENTS

| | | |
|---|---|---|
| CN | 107630789 A | 1/2018 |
| CN | 108561487 A | 9/2018 |
| CN | 208919204 U | 5/2019 |
| CN | 109869281 A | 6/2019 |
| CN | 109906294 A | 6/2019 |
| EP | 2889471 A1 | 7/2015 |
| EP | 3048295 A1 | 7/2016 |
| JP | 2019210810 A | 12/2019 |

OTHER PUBLICATIONS

German Patent No. DE 202020001588 published on Jun. 23, 2020.*
WO document No. 2020/125886 to Madsen et al published on Jun. 25, 2020.*
European Patent No. EP 4086458 to Ollgaard published on Nov. 9, 2022.*
PCT International Search Report and Written Opinion of International Searching Authority mailed Jul. 21, 2021 corresponding to PCT International Application No. PCT/EP2021/057947 filed Mar. 26, 2021.

* cited by examiner

TEMPORARY DAMPER ASSEMBLY

CROSS-REFERENCE TO RELATED APPLICATIONS

This application claims priority to PCT Application No. PCT/EP2021/057947, having a filing date of Mar. 26, 2021, which claims priority to EP Application No. 20167989.1, having a filing date of Apr. 3, 2020, the entire contents both of which are hereby incorporated by reference.

FIELD OF TECHNOLOGY

The following describes a temporary damper assembly for use during vertical storage and/or vertical transport of a tower.

BACKGROUND

A complete installed wind turbine may be provided with a permanent damper, for example a tuned mass damper that is mounted in the upper reaches of the tower. The damper is constructed to counteract oscillations at the natural frequency of the tower (its "eigenfrequency"). When the wind turbine tower oscillates, a tuned mass damper will also oscillate, but phase-shifted with respect to the tower oscillations. A liquid damper permanently mounted in the upper tower level may be partially filled with a sloshing liquid, and the quantity of liquid is chosen on the basis of the tower eigenfrequency. The effect of a permanent damper is to suppress the tower oscillations, keeping the amplitude within safe levels.

An offshore wind turbine can have a tower height in the order of 80-100 m. Such a tower generally comprises two or more essentially cylindrical hollow tower sections with circular flanges at either end. A tower section can be bolted to another tower section and/or a further structure such as a transition piece using bolts inserted through the flanges.

A wind turbine tower may be pre-assembled and temporarily stored before being loaded onto a ship for transportation to the installation site. While it is possible to store and transport a tower horizontally, the own weight can result in significant deformation or ovalization. Furthermore, an upending manoeuvre of a heavy and long tower can be hazardous. For these reasons, it may be desirable to store and transport a pre-assembled tower in its vertical or upright orientation.

However, there are certain problems associated with the vertical storage and transport of a tall tower. A main problem is vortex-induced cross-wind vibrations. This is particularly relevant during transport by ship, since the tower stands upright on deck and cannot be sheltered from the wind. A tower may be structurally compromised by vortex-induced cross-wind vibrations. Furthermore, the resulting loads must be borne by the mounting fittings on deck, and these can become damaged. Vortex-induced cross-wind vibrations during storage and transport can therefore lead to high costs. The permanent damper intended for installation in the wind turbine tower cannot be used to suppress such vibrations during storage and transport, because it is explicitly tuned to the eigenfrequency of the complete installed wind turbine including the nacelle, generator, aerodynamic rotor etc.

Therefore, it is necessary to provide a way of suppressing or damping vortex-induced cross-wind vibrations of a pre-assembled tower during storage and transport. In one approach, helical configurations of vortex strakes are attached to the outside of a tower prior to storage or transport in an exposed environment. The vortex strakes alter the airflow over the tower surface in such a way to prevent the development of vortices, and therefore prevent vortex-induced vibration. However, equipping a tower with vortex strakes can take many hours, and a similar length of time is required again to remove them. Furthermore, the work associated with mounting vortex strakes is largely dependent on weather conditions, and generally cannot be carried out in high winds or stormy conditions on account of the hazardous nature of the work.

SUMMARY

An aspect relates to provide an improved way of storing and transporting an upright tower.

According to embodiments of the invention, the temporary damper assembly is intended for use during storage and/or transport of a tower, and comprises a liquid damper that is tuned to the natural frequency of vibration of the tower; a tower cover realised to cover an annular upper opening of the tower during storage and/or transport; a mounting interface configured to suspend the liquid damper from the annular upper opening of the tower; and a load transfer means for the transfer of loads between the liquid damper and the tower.

An advantage of the inventive temporary damper assembly is that offshore handling effort is reduced, thereby reducing the overall costs. This is because the inventive temporary damper can be installed at (and later removed from) the upper level of a tower in a relatively brief procedure. In contrast, it can take many hours to prepare a tower with vortex strakes, and a similar length of time to detach the vortex strakes at the final destination of the tower. Furthermore, handling of the inventive temporary damper is relatively independent of weather conditions, compared to the handling of vortex strakes, which generally cannot be done in stormy conditions. A further advantage of the inventive temporary damper assembly is that it reduces the hazards involved in preparing a tower for storage and/or transport, since it involves less manual handling steps.

According to embodiments of the invention, the method of suppressing vortex-induced vibration in a tower during storage and/or transport comprises the steps of determining the natural frequency of vibration (i.e. the eigenfrequency) of the tower; tuning a liquid damper to that natural frequency; preparing a temporary damper assembly by attaching the tuned liquid damper to a tower cover and providing a load transfer means for the transfer of loads between the liquid damper and the tower; and mounting the temporary damper assembly onto an annular upper opening of the tower prior to storage and/or transport of the tower.

In the following, it may be assumed that a tower is intended for use in an offshore wind turbine. The tower of such a wind turbine generally has the form of a narrow cone with an essentially circular cross-section. The tower is widest at its base, where it can be mounted to a transition piece of an offshore foundation. Such a tower may be assumed to comprise two or more tower sections, and the tower is pre-assembled before transport to the offshore installation site.

The liquid damper is realized as a tank or other vessel that can be suspended in the interior of the tower. In an exemplary embodiment of the invention, the liquid damper is realised as an essentially cylindrical tank with a diameter of approximately 40%-50% of the tower interior diameter. The tank can be partially filled with a fluid or sloshing liquid such as BASF Glysantin® G30® which is primarily intended for use as an antifreeze. The liquid damper can comprise a fluid inlet/outlet so that the fill level of fluid can be adjusted. In an embodiment, the liquid damper is dimensioned for use with tower with natural frequencies in the range 0.45 Hz to 0.9 Hz. The step of tuning the liquid damper comprises adjusting the volume of liquid in the liquid damper. The volume of liquid present in the tank can be determined by weighing the liquid damper (on its own or as part of the assembled temporary damper assembly), for example.

The liquid damper can be installed using any suitable type of mounting interface. In an exemplary embodiment of the invention, the mounting interface comprises a plurality of brackets, for example removable adapter brackets. Each bracket extends between an outer surface of the liquid damper and the annular upper opening of the tower. The brackets are realized so that the liquid damper is centrally positioned in the tower interior. In an exemplary embodiment of the invention, the mounting interface comprises at least three brackets, evenly distributed at 120° intervals about the liquid damper.

The brackets can be attached to the liquid damper in any suitable manner. In an exemplary embodiment of the invention, shoes are provided on the outer surface of the liquid damper, and each shoe is shaped to receive a vertical side of a bracket. For example, a bracket can be slotted into a shoe and then bolted to the shoe using bolts, screws or other fasteners.

To suspend the liquid damper in the tower, the mounting interface extends to the upper rim of the tower where it can be attached to the tower flange. As explained above, the flange has a bolt circle through which bolts are passed when the tower is being attached to another tower or further component. In an exemplary embodiment of the invention, the mounting interface comprises a number of radial arms that extend outward to the upper rim. In a further exemplary embodiment of the invention, each radial arm can terminate in an arc segment. The curvature of an arc segment matches the curvature of the upper rim of the tower. In an embodiment, the radial arms are adjustable in length and/or the arc segments are detachable, so that the assembly can be adapted to a range of tower diameters. For example, the radial arm lengths can be lengthened or shortened as required, and a set of arc segments with suitable curvature can be chosen. In this way, the temporary damper assembly can be used for a variety of tower diameters.

The temporary damper assembly is provided by mounting the liquid damper to the top cover in such a way that the liquid damper is suspended from the underside of the top cover. When the top cover is placed onto the tower, the liquid damper will then be positioned in an upper level of the interior of the tower.

To be able to suppress vortex-induced vibration or other oscillations in the tower, a load transfer bridge is required between the liquid damper and the tower wall. In one approach, the liquid damper and/or its mounting interface could be constructed in such a way to achieve a form fit, i.e. to achieve physical contact between the tower interior wall and one or more surfaces of the liquid damper and/or its mounting interface. For example, each bracket can have an outer face that lies against the tower interior surface. However, such a form-fit construction would restrict the temporary damper assembly to a specific tower diameter. Therefore, in an exemplary embodiment of the invention, a maximum diameter of the mounting interface can be smaller than the inner diameter of the tower, and the difference is bridged by a plurality of adjustment bolts. For example, an adjustment bolt can be inserted into an essentially horizontal threaded bushing attached to or arranged in a bracket of the mounting interface, so that an outer end of the adjustment bolt can make contact with the tower interior surface. Of course, the outer end of the adjustment bolt can terminate in a flat pad or plate so that forces are spread over a larger area, thus avoiding damage to the tower surface. There are various other ways of bridging a gap between the mounting interface and the tower, for example using an arrangement of hydraulic cylinders to apply pressure to the tower interior surface.

The load transfer interface is adjusted or completed from the interior of the tower. To this end, a technician obtains access to the tower interior. When the temporary damper assembly has been lowered into place so that the top cover rests on the upper annular face of the tower, the technician can for example turn the adjustment bolts so that their outer ends apply sufficient pressure against the inner surface of the tower. The technician can access the upper tower level by an elevator that is part of the tower assembly, for example.

The temporary damper assembly is lifted by crane to the level of the upper end of the tower. A suitable lifting fitting can be provided, to hold the temporary damper assembly steady while it is suspended from the crane lifting tackle. The mounting interface comprises a plurality of connectors—e.g. eyelets—for connecting to cables of a lifting fitting. The tower cover can have openings through which such cables can pass, so that the cables can be attached to the brackets of the mounting interface. In an exemplary embodiment, the top cover comprises a plurality of hatches that can be opened to accommodate cables of a lifting fitting. Once the temporary damper assembly is in place, the cables are detached, and the hatches can be closed again so that the tower interior is sealed off from the environment. In a further exemplary embodiment, the tower cover comprises an elastomer rim arranged to rest on the annular upper end of the tower. An elastomer or rubber rim can act as a seal to prevent water from entering the tower interior.

BRIEF DESCRIPTION

Some of the embodiments will be described in detail, with reference to the following figures, wherein like designations denote like members, wherein.

DETAILED DESCRIPTION

Figure 1:
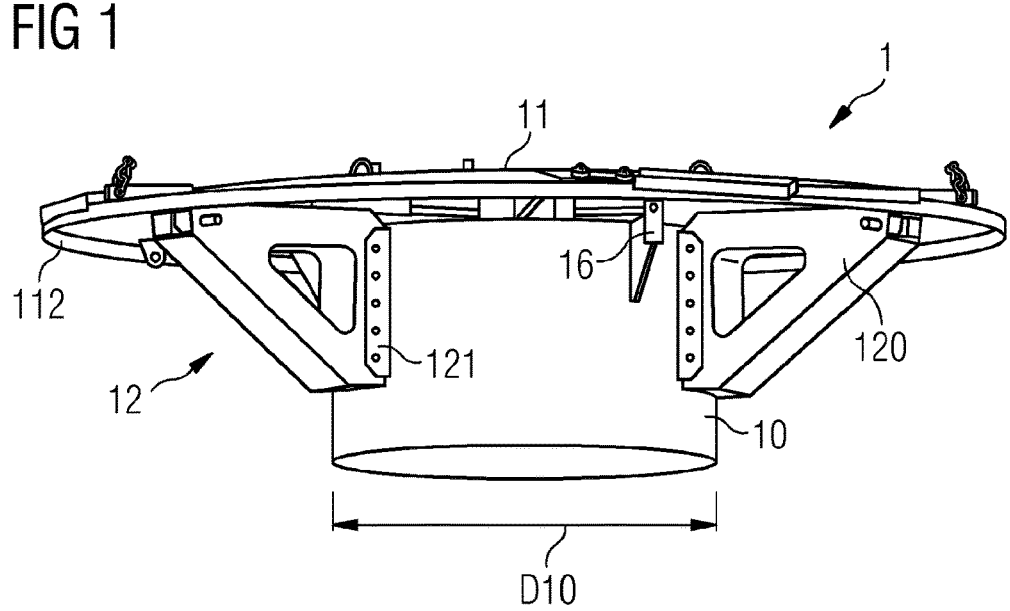
FIG. 1 shows an embodiment of the inventive temporary damper assembly.

FIG. 1 shows an embodiment of the inventive temporary damper assembly 1, and shows a liquid damper 10 suspended from a tower top cover 11. In one exemplary embodiment, the top cover 11 can have an arrangement of panels or fittings on its underside, to which the damper 10 can be secured using bolts.

The diameter D10 of the damper 10 is significantly less than the interior diameter of a tower. In this exemplary embodiment, a mounting interface 12 comprises three angular brackets 120 (two are visible in the drawing) evenly distributed about the damper 10, and mounted in shoes 121 provided on the outer face of the damper 10. An elastomer seal or rim 112 is provided at the outer edge of the top cover 11. One of several lifting brackets 16 is shown. These are provided for attaching to cables of a lifting fitting during a lifting manoeuvre.

Figure 2:
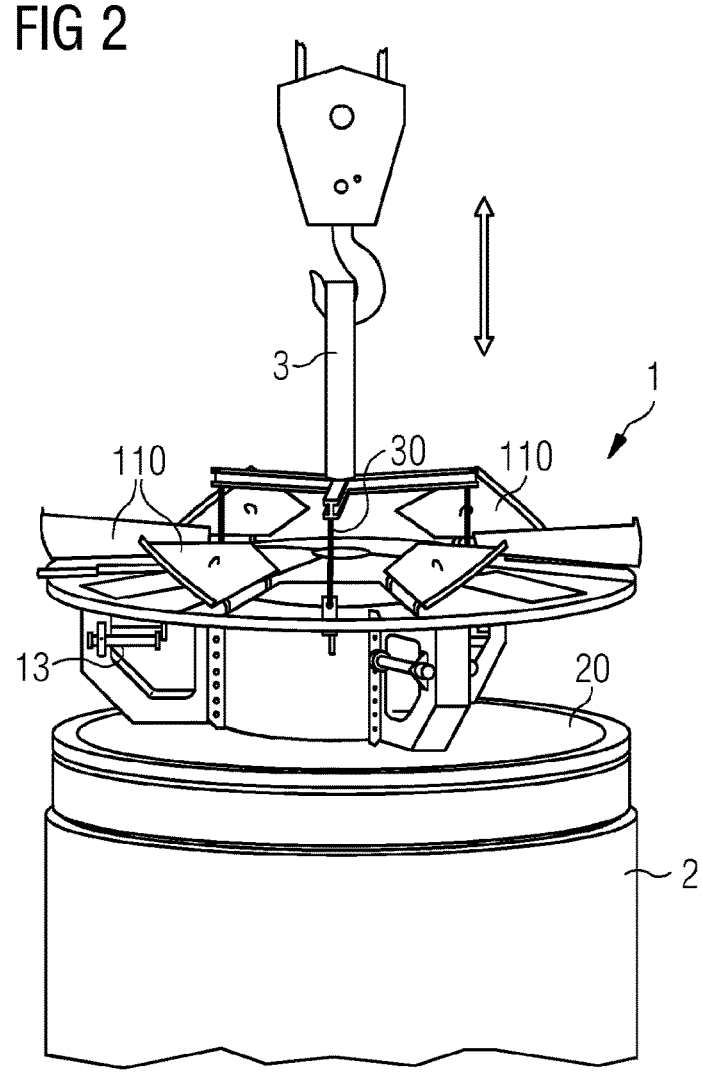
FIG. 2 shows an embodiment of the inventive temporary damper assembly being lowered onto a tower.

FIG. 2 shows a temporary damper assembly 1 being lowered towards a tower 2 so that the damper 10 will be positioned in the interior space at the upper level of the tower 1. A lifting fitting 3 is being used, and is suspended from lifting tackle of a crane (not shown). Several cables 30 extend from the lifting fitting 3 to the lifting brackets 16. During a lifting manoeuvre, hatches 110 of the top cover are opened, and the cables 30 extend through the opened hatches.

The upper level of the tower 2 may be 80-100 m above ground so that it is difficult or even impossible to assess the accuracy of the manoeuvre from a position on the ground. Therefore, to avoid damage to the temporary damper assembly 1 or the tower 2, a number of cameras and/or sensors (not shown) can be deployed to provide feedback about the lifting manoeuvre so that position adjustments can be made as necessary.

Figure 3:
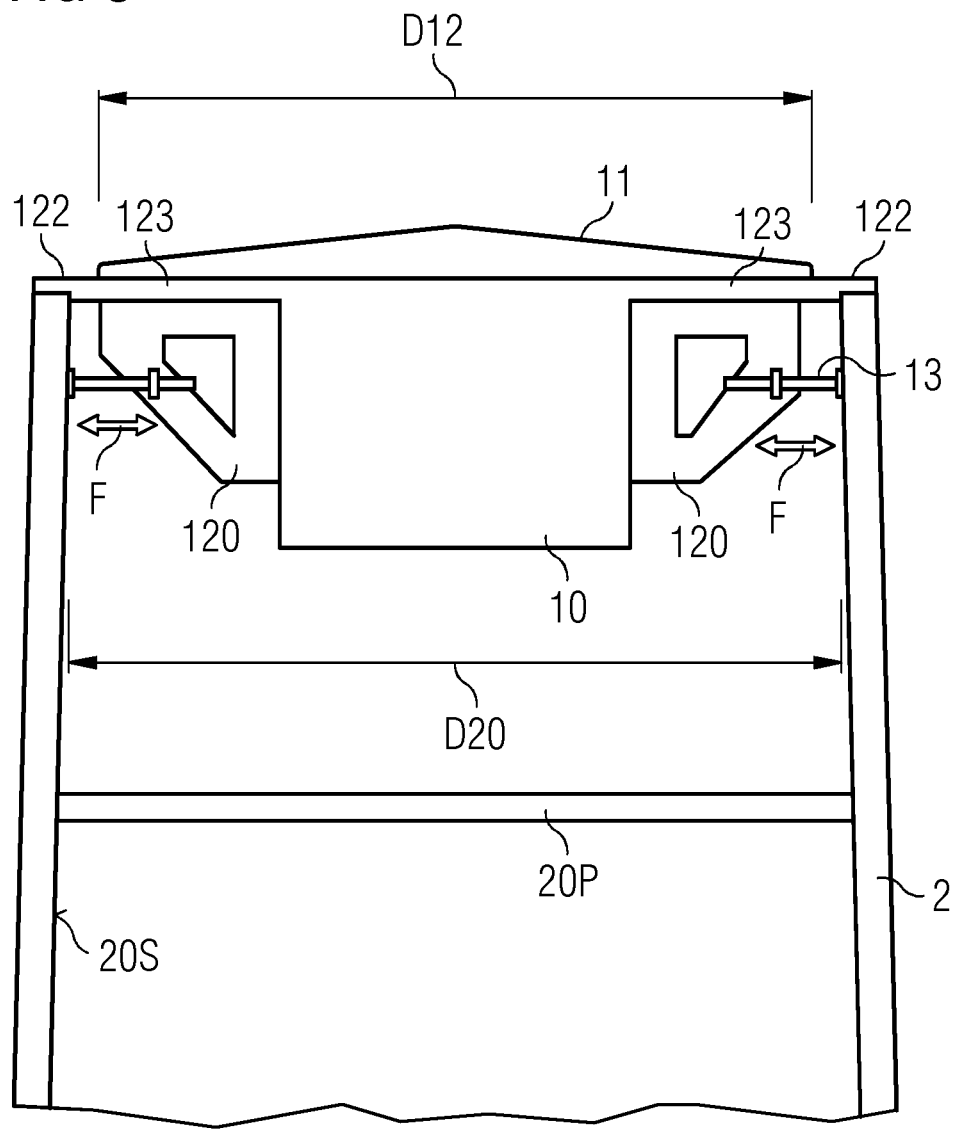
FIG. 3 shows an embodiment of the inventive temporary damper assembly in place on a tower.

FIG. 3 shows an embodiment of the inventive temporary damper assembly 1 in place on a tower 2. An interior floor or platform 20P is indicated. A tower may generally be constructed to include a platform 20P near its upper end so that service personnel can work at this level. The arc segments 122 at the outer ends of the radial arms 123 rest on the circular rim of the tower 2. For simplicity, the diagram shows two brackets 120 at diametrically opposite sides of the damper 10. However, it shall be understood that at least three brackets 120 would be deployed, evenly spaced about the cylindrical body of the liquid damper 10. The diagram indicates the load transfer bridge comprising adjustment bolts 13 that are tightened so that their outer ends are pressed against the tower interior surface 20S. The diameter D12 defined by the outer ends of the brackets 120 can therefore be smaller than the inner diameter D20 of the "smallest" tower (of a number of different-sized towers), and the adjustment bolts 13 can bridge the gap. In this way, one type of temporary damper assembly 1 can be prepared for use with towers of different diameters. Each of these towers can be stored and/or transported vertically using a single type of temporary damper assembly 1.

Figure 4:
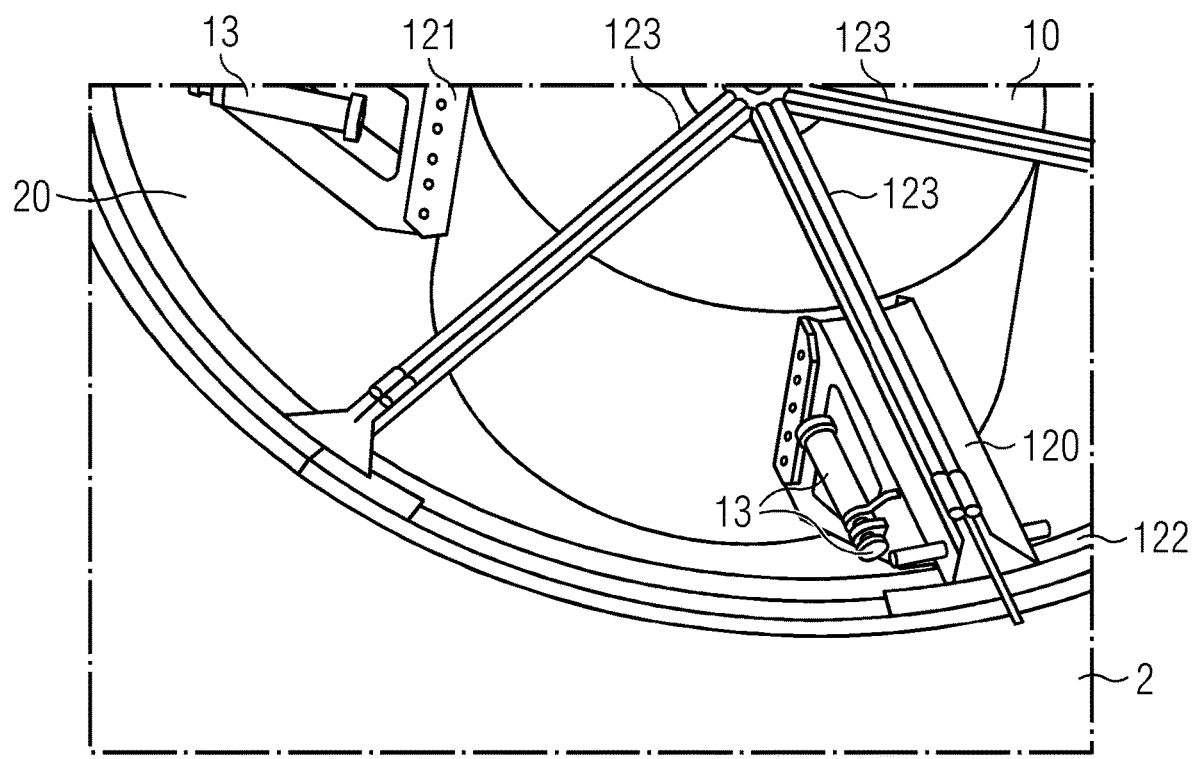
FIG. 4 shows a perspective view into an embodiment of the inventive temporary damper assembly in place on a tower.

FIG. 4 shows a perspective view into an embodiment of the inventive temporary damper assembly 1 in place on a tower 2. The top cover 11 is not shown but shall be assumed to be present. The diagram shows the radial arms 123 (six in this embodiment), terminating in exchangeable arc segments 122. The arc segments 122 are chosen to match the curvature of the tower flange. The diagram also shows several adjustment bolts 13 in retracted position (not pressed against the tower wall).

Figure 5:
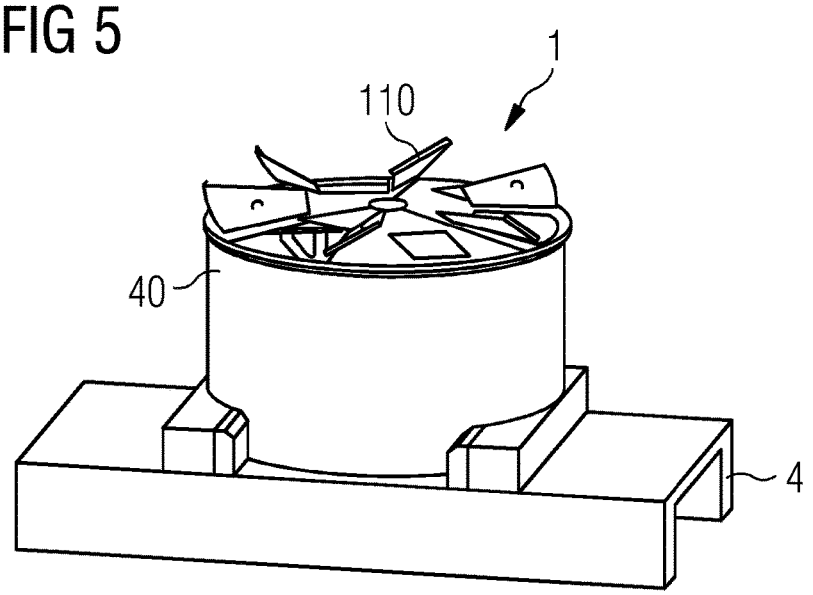
FIG. 5 shows embodiments of the inventive temporary damper assembly parked on a nacelle transport frame.

FIG. 5 shows embodiments of the inventive temporary damper assembly 1 "parked" on a nacelle transport frame 4. After unloading a tower at an offshore installation site, mounting the tower onto a foundation and mounting the nacelle onto the tower, the temporary damper assembly 1 that was used with the tower can be parked on a yaw support part 40 of the nacelle transport frame, since the diameters correspond.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A temporary damper assembly for use during vertical storage and/or vertical transport of a tower, the damper assembly comprising:
    a liquid damper tuned to a natural frequency of vibration of the tower;
    a tower cover configured to cover an annular upper opening of the tower during storage and/or transport;
    a mounting interface configured to suspend the liquid damper from the annular upper opening of the tower, the mounting interface comprising a number of radial arms; and
    a load transfer interface for a transfer of loads between the liquid damper and the tower;
    wherein the liquid damper is positioned within an interior of the tower.

2. The temporary damper assembly according to claim 1, wherein the liquid damper comprises an essentially cylindrical tank with a diameter that is at most 80% an interior diameter of the tower.

3. The temporary damper assembly according to claim 1, wherein the mounting interface comprises a plurality of brackets configured to extend between the liquid damper and an interior surface of the tower.

4. The temporary damper assembly according to claim 1, wherein the mounting interface comprises a plurality of shoes arranged on the liquid damper, and wherein a shoe is shaped to receive a bracket.

5. The temporary damper assembly according to claim 1, wherein each radial arm terminating in an arc segment, and wherein a curvature of an arc segment is based on a curvature of the annular upper opening of the tower.

6. The temporary damper assembly according to claim 1, wherein the mounting interface comprises a plurality of connectors for connecting to cables of a lifting fitting.

7. The temporary damper assembly according to claim 1, wherein the tower cover comprises a plurality of hatches that are opened to accommodate cables of a lifting fitting.

8. The temporary damper assembly according to claim 1, wherein the load transfer interface comprises a plurality of adjustment bolts, wherein an adjustment bolt extends between the mounting interface and an inner surface of the tower.

9. The temporary damper assembly according to claim 1, wherein the liquid damper is dimensioned for tower with natural frequencies in a range 0.55 Hz to 0.8 Hz.

10. The temporary damper assembly according to claim 1, wherein the liquid damper comprises an essentially cylindrical tank with a diameter that is at most 60% an interior diameter of the tower.

11. The temporary damper assembly according to claim 1, wherein the liquid damper is suspended from an underside of the tower cover so the liquid damper is located below the tower cover and within the interior of the tower.

12. The method according to claim 1, wherein the liquid damper is suspended from an underside of the tower cover so the liquid damper is located below the tower cover and within the interior of the tower.

13. A method of suppressing vortex-induced vibration in a tower during vertical storage and/or vertical transport of the tower, the method comprising:
    determining a natural frequency of vibration of the tower;
    tuning a liquid damper to the natural frequency;

preparing a temporary damper assembly by attaching the tuned liquid damper to a tower cover and providing a load transfer interface for a transfer of loads between the liquid damper and the tower, wherein the preparing the temporary damper assembly comprises selecting elements of a mounting interface on a basis of a diameter of the tower;

mounting the temporary damper assembly at an upper end of the tower prior to vertical storage and/or vertical transport of the tower so that the tuned liquid damper is located within an interior of the tower during the vertical storage and/or vertical transport; and attaching a selected arc segment to each of a plurality of radial arms of the mounting interface and/or mounting a plurality of selected brackets onto shoes on an exterior of the liquid damper.

14. The method according to claim 13, further comprising deploying a lifting apparatus to bring the temporary damper assembly to an upper level of the tower.

15. The method according to claim 13, wherein adjustment bolts of the load transfer interface are manually tightened from an interior of the tower.

16. The method according to claim 13, further comprising detaching the temporary damper assembly from the tower and deploying a lifting apparatus to transfer the temporary damper assembly to a nacelle transport frame.

* * * * *